United States Patent [19]

Roncke

[11] 3,740,610
[45] June 19, 1973

[54] SWITCH ARRANGEMENT INCLUDING A THYRISTOR

[75] Inventor: Gerhard Roncke, Hamburg, Germany

[73] Assignee: U.S. Philips Corporation, New York, N.Y.

[22] Filed: Mar. 19, 1971

[21] Appl. No.: 126,152

[30] Foreign Application Priority Data
Mar. 26, 1970 Germany.................... P 20 14 923.9

[52] U.S. Cl.............. 315/241 P, 315/159, 315/241
[51] Int. Cl...................... H05b 41/32, H05b 41/40
[58] Field of Search............. 307/305, 246, 252 M; 315/149–159, 205, 227, 241, 241 P; 320/1

[56] References Cited
UNITED STATES PATENTS
3,530,310  9/1970  Adelson et al. ............... 307/252 M
3,591,829  7/1971  Murata .......................... 315/159 X Primary Examiner—Rudolph V. Rolinec
Assistant Examiner—Marvin Nussbaum
Attorney—Frank R. Trifari

[57] ABSTRACT

A switching circuit for a flash discharge tube includes a first thyristor in series with the tube across a DC voltage source. The thyristor is rapidly extinguished by an auxiliary circuit that includes, in series, a first capacitor, a second thyristor, and the parallel connection of a second capacitor and a resistor. A charge circuit for the first capacitor is connected partly in parallel with the tube and is exclusive of the first thyristor. A preferred embodiment also includes a diode in shunt with the first capacitor. The novel circuit is arranged to prevent reverse charging of the capacitors so that electrolytic capacitors may be used which results in a compact flash unit.

10 Claims, 1 Drawing Figure

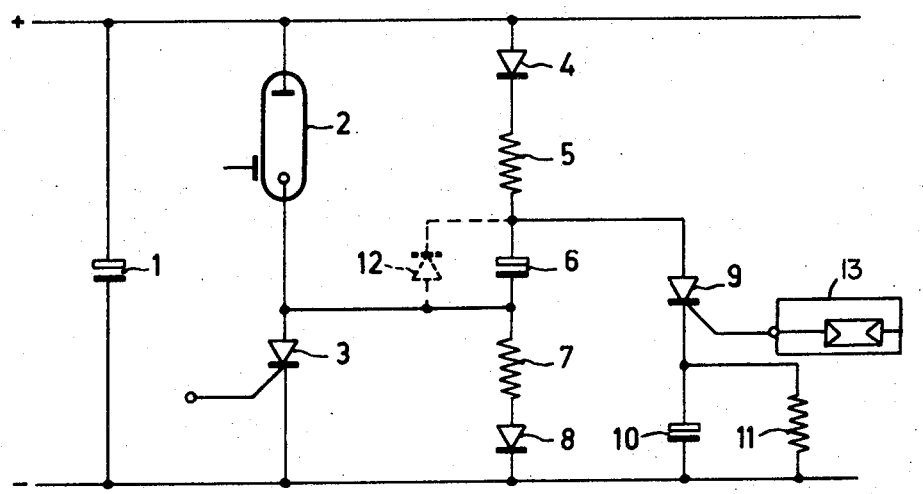

SWITCH ARRANGEMENT INCLUDING A THYRISTOR

The present invention relates to an improved thyristor switching arrangement and more particularly to a device for automatically controlling the electronic flash in a photography system. A device of this type may comprise a switch-arrangement including a thyristor which is connected in series with a load, across the two terminals of a direct voltage source and in which an auxiliary circuit is present which includes a series arrangement of a first capacitor and a second thyristor. The first thyristor may be rendered non-conducting with the aid of the auxiliary circuit in the charged condition of the first capacitor, a charge circuit of the first capacitor being connected at least partially in parallel with the load.

A known switch arrangement of the kind mentioned above is described, for example, in United Kingdom Pat. specification No. 995,615. In this switch arrangement the first capacitor (also called the commutation capacitor) is charged prior to rendering the first thyristor non-conducting. Subsequently this capacitor is arranged in parallel with the first thyristor due to the second thyristor being rendered conducting so that the discharge current of the capacitor counteracts the load current flowing through the first thyristor. The current flowing through the first thyristor consequently drops below its holding current value so that this thyristor is cut off.

A drawback of this known switch-arrangement is that when the first thyristor is rendered non-conducting, the first capacitor is not only discharged but even assumes an opposite charge. This means that this capacitor cannot be an electrolytic capacitor occupying little space but must be a bulky capacitor, for example, a paper capacitor.

A further possibility for a switch arrangement would be to use a series arrangement of a main thyristor, an auxiliary inductance and the load, while a commutation capacitor would then be connected across the auxiliary inductance through an auxiliary thyristor. In that case a voltage would be generated across the auxiliary inductance due to the commutation capacitor being discharged across the auxiliary inductance (as a result of the auxiliary thyristor being rendered conducting), which voltage would render the main thyristor non-conducting. This further possibility for a switch-arrangement also has the same drawback as the one described above, namely the capacitor is also recharged to an opposite polarity so that it is not possible to use an electrolytic capacitor of small dimensions.

The aforesaid drawbacks in the known switch arrangements limits the use thereof in apparatus in which the dimensions of the circuit elements are critical such as, for example in electronic flash devices for photography.

An object of the present invention is to provide a circuit arrangement of the kind described in the preamble in which the capacitor(s) is(are) prevented from being charged to an opposite polarity, so that it (they) may have relatively small dimensions.

According to the invention the switch-arrangement includes a thyristor which is connected in series with a load across the two terminals of a direct voltage source. An auxiliary circuit is present which includes a series arrangement of a first capacitor and a second thyristor. The first thyristor may be rendered non-conducting with the aid of the auxiliary circuit in the charged condition of the first capacitor, a charge circuit of the first capacitor being connected at least partially in parallel with the load. The switch arrangement is characterized by the fact that the auxiliary circuit also includes a second capacitor which is shunted by a resistor and which is arranged in series with the second thyristor.

An advantage of this switch-arrangement is that the second capacitor, which is normally uncharged as a result of the (discharge) resistor connected thereacross, is charged during the extinguishing process of the first thyristor so that this (counter) voltage across the second capacitor can reduce the current flowing through the first capacitor to zero before this first capacitor is recharged. In addition the second capacitor itself is incorporated in the direct current circuit in such a manner that a recharge of this second capacitor need not be feared. Both capacitors may therefore be electrolytic capacitors.

In a preferred embodiment of a switch-arrangement according to the invention the first capacitor is shunted by a diode. An advantage thereof is that there is greater freedom in the choice of the capacitance of the second capacitor, which gives rise to the fact that the available recovery time for the first thyristor after blocking of this thyristor may be increased so that it is easy to remain above the minimum recovery time required for this thyristor.

In a further preferred embodiment the switch-arrangement is included in a circuit in which a gas discharge flash tube (electron flash tube) forms the load and a control circuit of the second thyristor is equipped with a photosensitive element.

The last-mentioned preferred embodiment has the advantage that a flashing unit of small dimensions can be obtained with which flashes can be effected in known manner, for example, for taking photographs, while the flashing duration is determined by the quantity of light which is projected onto an object to be photographed by the gas discharge flash tube. The blocking command is then derived from the light reflected by the irradiated object onto the photosensitive element in the circuit of the second thyristor. The use of a photosensitive element to terminate the flash duration is well known in the art and is described, for example, in U.S. Pat. No. 3,662,213.

In order that the invention may be readily carried into effect, an embodiment thereof will now be described in detail, by way of example, with reference to the accompanying diagrammatic drawing in which the sole FIGURE illustrates a preferred form of the invention.

In this drawing the reference numeral 1 denotes a supply capacitor which is charged to a relatively high voltage by means of a direct voltage source consisting of, for example, a voltage converter. A series arrangement of a gas discharge flash tube (electron flash tube) 2 and a first thyristor 3 is connected across the capacitor 1. Connected in parallel with this series arrangement of the tube 2 and the thyristor 3 is a series arrangement of a diode 4, a resistor 5 having a high ohmic value, a first electrolytic capacitor 6, a resistor 7 having a high ohmic value, and a diode 8. Furthermore, the assembly comprising capacitor 6, resistor 7 and diode 8 is shunted by a second thyristor 9 and a second electrolytic capacitor 10. Furthermore, a discharge resistor 11 is connected across capacitor 10. If necessary, a diode 12 may be connected across capacitor 6.

The operation of the described circuit is as follows: Simultaneously with the charging of the supply capacitor 1, the commutation capacitor 6 is also charged (through the circuit 4, 5, (6), 7, 8). For the time being the capacitor 10 is uncharged.

Due to the application of simultaneous pulses on the control electrodes of the tube 2 and the thyristor 3, the capacitor 1 starts to discharge across the tube 2. When a desired quantity of the light emitted from this tube is reflected through an object (not shown) onto a photosensitive cell (not shown), which is included in the control circuit 13 of the thyristor 9 in a manner described in U.S. Pat. No. 3,662,213, the variation in resistance of this photosensitive cell results in the thyristor 9 being triggered into conduction. Then a current starts to flow in the circuit comprising capacitor 6, thyristor 9, capacitor 10, so that the current already present in thyristor 3 is counteracted. As a result the current flowing through thyristor 3 drops below its holding current value whereupon this thyristor is cut-off. The capacitor 10 is meanwhile charged to a slight extent and this charging is also continued through the circuit 2, 6, 12, 9, 10 after the thyristor 3 is cut-off. This further charging of the capacitor 10 and the simultaneous discharging of capacitor 6 results in a negative anode voltage at the thyristor 3 during its recovery time.

If the minimum operating voltage of the tube 2 is not considered, the current flowing through the circuit 2, 6, 10 will stop when the vector sum of the voltages across the capacitors 10 and 6 has become equal to the voltage of the supply capacitor 1. This means that in the absence of diode 12, if the capacitance of capacitor 10 is chosen to be smaller than that of capacitor 6, the last-mentioned capacitor is certainly not recharged so that electrolytic capacitors may be chosen for the two capacitors 6 and 10. The capacitances of the capacitors are also determined by the required recovery time of the thyristor 3, the voltage to which the capacitors 1 and 6 are previously charged, and by the properties of the load 2.

The thyristor 9, which has been rendered conducting to block the thyristor 3, becomes non-conducting when the current flowing through this thyristor 3 is reduced to zero after the capacitor 10 has been charged. The capacitor 10 is then discharged across the resistor 11 so that this capacitor is again ready for the next blocking process.

Since the capacitor 6 is not recharged only when the capacitance of the capacitor 10 is at the most equal to that of the capacitor 6, the normal spread in capacitance of the capacitors must be taken into account when designing a practical switch-arrangement.

Thus, either the capacitance of capacitor 10 may be made so small that even in the most unfavorable case the capacitance of the capacitor 10 does not exceed that of the capacitor 6, or the capacitor 6 may be shunted by a diode (12) so that recharging is prevented. When using the diode 12 it is possible to choose a higher capacitance for the capacitor 10, for example, equal to that of capacitor 6, so that the time which elapses before a positive voltage is present again at the anode of the thyristor 3 (positive relative to its cathode) is at a maximum.

The two diodes 4 and 8 serve to prevent direct coupling of the potential of the capacitor 6 during the blocking process to the potential of one of the supply terminals.

If desired, the tube 2 and the thyristor 3 may alternatively be interchanged. In that case one end of the series arrangement of thyristor 9 and capacitor 10 can be connected to the positive terminal of the direct voltage source and the other end of this series arrangement can be connected to the junction of capacitor 6 and resistor 7.

What is claimed is:

1. A switching device adapted for connection to the terminals of a source of DC voltage comprising, first and second thyristors, a load including a flash discharge tube, means connecting the first thyristor in series with the load across the terminals of the DC voltage source, a resistor, first and second capacitors, an auxiliary control circuit coupled to the first thyristor comprising the series arrangement of the first capacitor, the second thyristor, and the parallel connection of the second capacitor and said resistor, a charge circuit for said first capacitor connected in series therewith across the terminals of the voltage source and arranged to provide a charge path for said first capacitor which is exclusive of said first thyristor, means including said auxiliary circuit for turning said first thyristor off in the charged condition of said first capacitor, and means for applying a trigger voltage to the control electrode of said first thyristor.

2. A device as claimed in claim 1 further comprising a diode connected in shunt with the first capacitor and poled in the same direction as the second thyristor.

3. A device as claimed in claim 1 wherein said charge circuit is connected in shunt with the series arrangement of the load and the first thyristor.

4. A device as claimed in claim 3 further comprising a diode connected in shunt with the first capacitor and with the same polarity as the second thyristor.

5. A device as claimed in claim 4 wherein said charge circuit further comprises a second diode connected between one terminal of the voltage source and one terminal of the first capacitor and a third diode connected between the other terminal of the first capacitor and the other terminal of the voltage source, said second and third diodes each being connected with opposite polarity to that of the first diode.

6. A device as claimed in claim 1 wherein the capacitance value of said second capacitor is limited to a range of values that is lower than the capacitance of the first capacitor and with a maximum value that is equal to that of the first capacitor.

7. A switching device for a flash discharge tube comprising, a source of DC voltage, first and second thyristors, means connecting said first thyristor in series with the tube across the terminals of the DC voltage source, a resistor, first and second capacitors, a charge circuit for the first capacitor connected in series therewith across the terminals of the voltage source so as to charge said first capacitor in the cut-off state of said first thyristor, means serially connecting said first capacitor, said second thyristor and the parallel connection of the second capacitor and said resistor across said first thyristor whereby conduction in said second thyristor is operative to cut-off conduction in the first thyristor, and means for selectively applying trigger signals to the control electrodes of said first and second thyristors.

8. A device as claimed in claim 7 wherein the capacitance of said second capacitor is less than or at the most equal to the capacitance of said first capacitor.

9. A device as claimed in claim 7 further comprising a diode connected in parallel with said first capacitor.

10. A device as claimed in claim 9 further comprising a photosensitive element connected to the control electrode of the second thyristor and arranged to be irradiated by the light reflected by an object exposed to the flash tube light.

* * * * *

UNITED STATES PATENT OFFICE
CERTIFICATE OF CORRECTION

Patent No. 3,740,610      Dated June 19, 1973

Inventor(s) GERHARD RONCKE

It is certified that error appears in the above-identified patent and that said Letters Patent are hereby corrected as shown below:

```
col. 1, line  8, cancel the comma (,);

line  9, cancel "and in" and insert a period (.);

line 10, cancel "which an" and insert -- An --;

line 19, cancel "specification";

line 50, cancel "an" and insert -- the --;

col. 2, line 12, cancel "this" and insert -- the --;

line 57, after "converter" insert -- (not shown) --;

col. 3, line 45, cancel "3" and insert -- 9 --;
```

Signed and sealed this 27th day of November 1973.

(SEAL)
Attest:

EDWARD M. FLETCHER, JR.            RENE D. TEGTMEYER
Attesting Officer                  Acting Commissioner of Patents